March 1, 1927.

J. R. OLIVER 1,619,482

PRESS FOR CUTTING OR PUNCHING SHEET MATERIAL

Filed June 2, 1925

INVENTOR
John R. Oliver
BY Rogers, Kennedy & Campbell
ATTORNEYS.

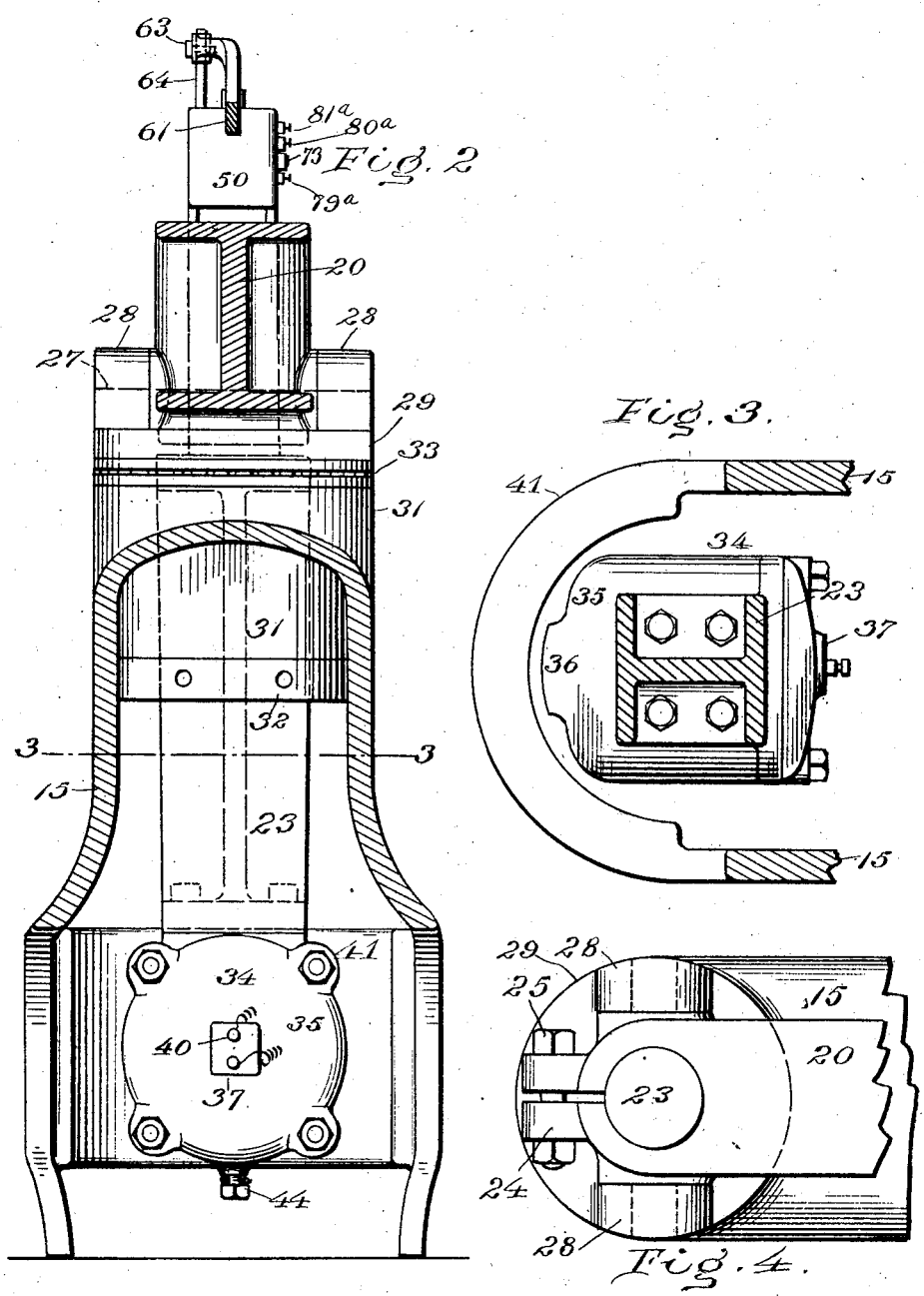

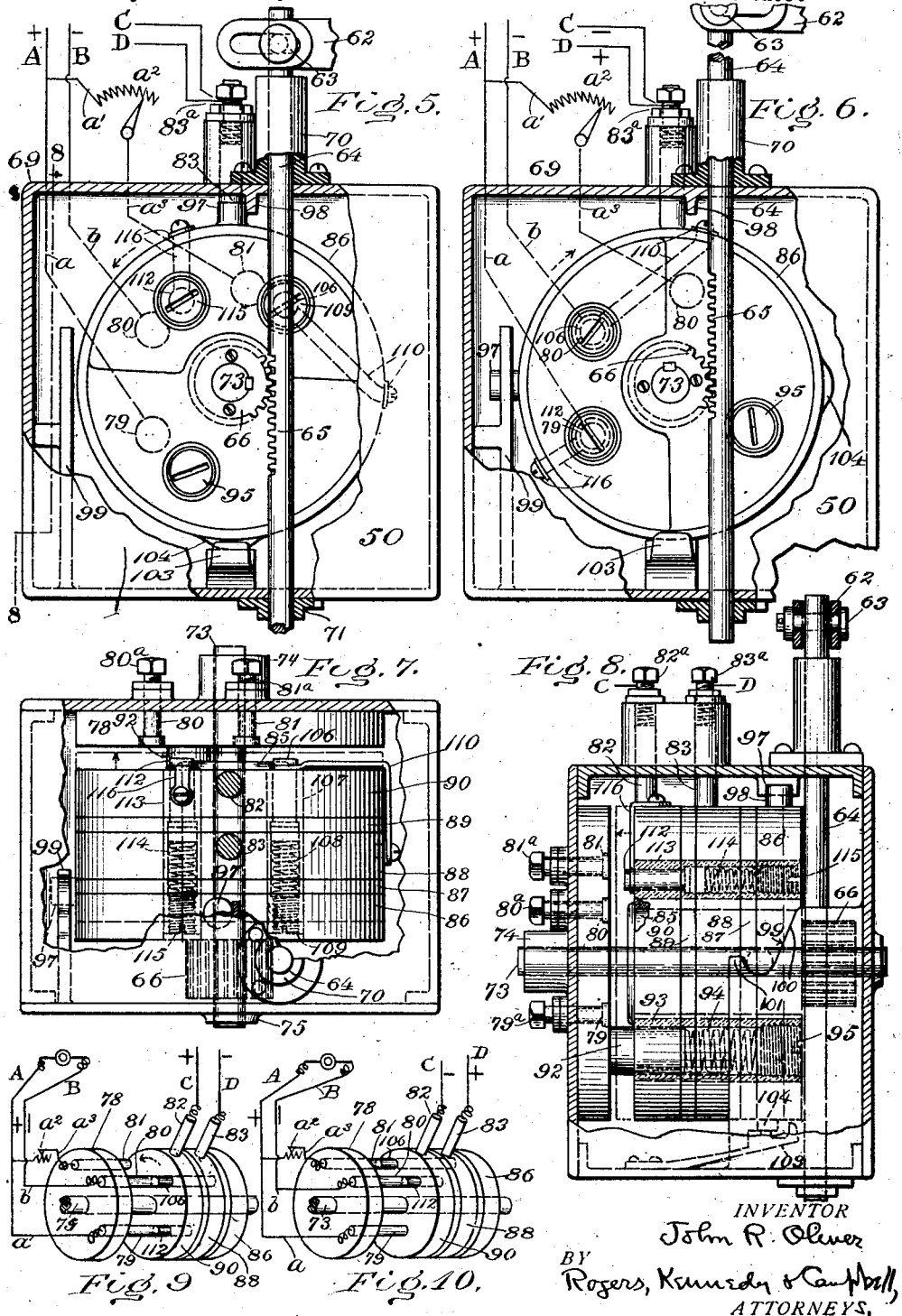

Patented Mar. 1, 1927.

1,619,482

UNITED STATES PATENT OFFICE.

JOHN ROGER OLIVER, OF MEDFIELD, MASSACHUSETTS, ASSIGNOR TO REECE SHOE MACHINERY COMPANY, OF BOSTON, MASSACHUSETTS, A CORPORATION OF MAINE.

PRESS FOR CUTTING OR PUNCHING SHEET MATERIAL.

Application filed June 2, 1925. Serial No. 34,420.

This invention relates to presses for cutting or punching sheet material, and while the principles of the invention might be employed in various types of presses for such purposes, the same are herein shown applied illustratively to a type of press adapted more especially for the purpose of dieing out leather or similar sheet material to produce the constituents of various articles, such as the uppers of boots and shoes.

A typical example of the class and type of machine referred to is shown in the patent of A. R. Schoenky 1,228,834, patented June 5, 1917, such machine being known in the trade as a "clicking machine" and embodying a heavy frame supporting a flat horizontal bed over which may be spread the leather, and a presser or head adapted to descend upon a loose die, placed upon the leather, and force it through the material, the die being a detached member with knife edges adapted to be selectively positioned according to the condition or defects in the leather, and the overhanging presser being fitted so that it may swing laterally into and from position, enabling clear inspection of the work between cutting operations. While such clicking machines have proven very successful in operation and output they possess certain disadvantages, including the fact that the heavy presser head, with its connected parts, when power operated to descend upon the die and return, tends to cause vibrations in the flooring and frame of the building in which the machines are used, which sometimes results in substantial annoyance, discomfort and possible damage and danger. Another disadvantage of the machine referred to is that the parts are unnecessarily heavy for dieing out the thinner articles or components of shoes, not requiring the momentum and force of blow required for example by sole leather or other heavy material.

Among the objects therefore of the present invention are to afford a clicking machine or cutting press which will be lighter in construction and operation than existing presses, substantially free from the vibration troubles referred to, and which will be effective and quick operating upon the lighter grades of goods. Another object is to minimize complication of mechanism, first cost, and maintenance by dispensing with the usual mechanical power drive, involving fly wheel and clutch, and substantially to simplify and reduce the mechanical parts and movements to the minimum; this being herein specifically done by the substitution of magnetism as a motive force, controlled only by an electric switch and circuits. A further object is to obviate the cumbersomeness and complication inherent in the type of machine wherein the presser head is fitted for vertical sliding movements toward and from the bed, and to substitute therefor a swinging or rocking mode of movement, reducing weight, complication and expense and minimizing body vibration. Other and further objects and advantages of the present invention will be elucidated in the hereinafter following description of an illustrative embodiment thereof or will be apparent to those conversant with the art. To the attainment of the above referred to objects and advantages the present invention consists in the novel press or cutting machine and the novel features of combination, arrangement, mechanism and detail herein illustrated or described.

In the accompanying drawings disclosing one form in which the invention may be embodied Fig. 1 may be described as a left elevation of the machine, the operative standing at the right of the figure for manipulating the work, the die, the presser head, and the controlling mechanism.

Fig. 2 is a front elevation taken partly in section on the line 2—2 of Fig. 1.

Fig. 3 is a plan view partly in section on the line 3—3 of Fig. 2.

Fig. 4 is a plan view of the rear end of the presser head or arm.

Fig. 5 is a left elevation of the controlling switch shown above the presser head in Figs. 1 and 2, the same partly broken away to show the interior construction, the switch being open and the circuit broken.

Fig. 6 is a view similar to Fig. 5 showing the parts in a different position, with the circuits closed to energize the operating magnet.

Fig. 7 is a top view of the parts seen in Fig. 5, partly broken away, and with the circuits open.

Figure 1:
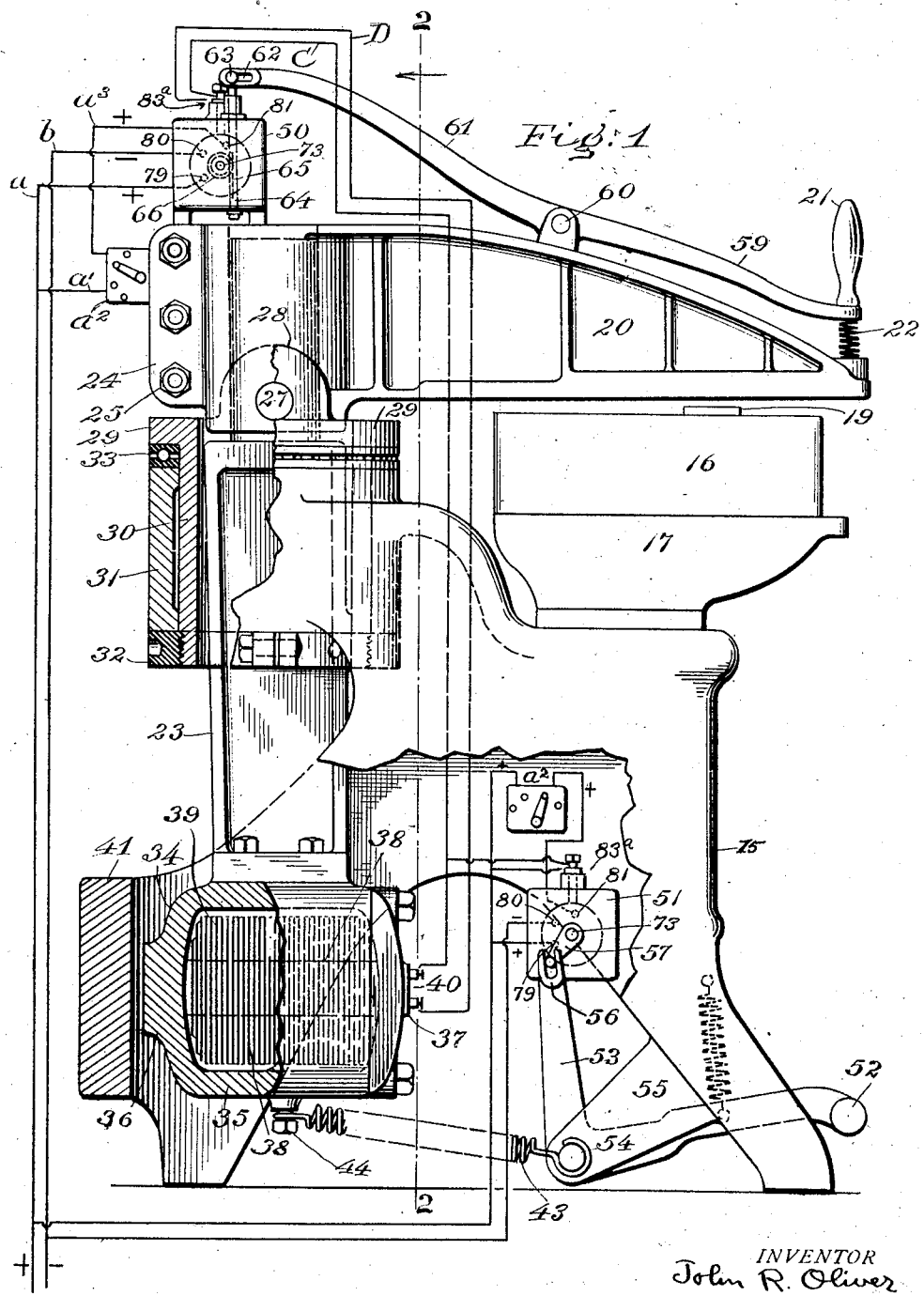

Fig. 8 may be described as a rear elevation taken partly on the line 8—8 of Fig. 5, also showing the circuits open.

Figs. 9 and 10 are diagrams of the switch, Fig. 9 showing the adjustment when the circuits are closed for energizing the magnet, and Fig. 10 showing the circuits momentarily closed reversely to insure demagnetization and permit return of the presser head.

The general parts of the machine include a heavy four-legged frame or base 15. At the front part of the frame is supported a cutting block or bed 16, resting upon a support 17 which may, in a well known manner, be adjustable so as to determine the elevation and proper levelness of the cutting bed. The bed or block 16 may be of usual character, consisting for example of assembled components of wood, with the grain standing vertically and clamped solidly together. Above the cutting block is shown a loose die 19 such as already above referred to, adapted to be laid selectively upon the leather and forced through to the cutting block. Fig. 1 indicates the fore and aft dimension of the cutting block; its lateral dimension may be two or more times as great, as indicated in the prior patent, so as to accommodate a large area of material and thus minimize shifting operations. The laterally swinging presser head or arm 20 is journalled or swivelled at its rear end to permit horizontal swinging movements laterally above the bed, readily effected by means of a handle 21. In the prior patent the head swings laterally to selected positions and then descends with a sliding motion by reason of being attached at its rear end to a vertically sliding member or column, the head being supposed to remain parallel with the cutting block in its downward and upward movements. In the herein illustrated machine the presser head not only swings horizontally across the cutting block but swings downwardly for the cutting movement, being journalled or trunnioned for this purpose as will be described. The elements are so proportioned and arranged that when the head has descended upon the die and forced the die through the work to the cutting block, the lower surface of the head will at such time be exactly parallel with the top surface of the cutting block. When swung upwardly to the position seen in Fig. 1 these elements are slightly out of parallel, as shown. No detrimental results effects from this nonparallelism, especially in cutting a relatively thin part, as the departure from parallelism is negligible, and during the quick striking or pressing blow the head comes into exact parallelism with the block, so that the knife edges of the die are forced firmly and accurately through the work.

In order to afford the positioning and operating movements of the presser head just described there are preferably two mechanical elements between the head and the frame, one permitting the lateral swinging or positioning movements, the other permitting the downward swinging or operating movements. A convenient way to effect this mounting is to provide a horizontal fulcrum or trunnion connecting the presser head with an intermediate element which itself is fitted to rotate about a vertical axis. In this case the operating force may be applied directly to the presser head or to a part or extension connected rigidly with it, so as to give an abrupt and forcible downward swinging movement of the head after it has been properly positioned over the die upon the work.

Referring particularly to the construction illustrated in Figs. 1 to 4 the presser head 20 is shown rigidly mounted at the upper end of a swinging column or post 23. The upper end of the post 23 is shown as cylindrical, and engaging in a corresponding recess in the rear end of the presser head, where the two are tightly clamped through lugs 24 and bolts 25 as best seen in the top view Fig. 4. The lower end of the post may be shaped like the letter H as seen in Fig. 3 or otherwise to give rigidity with lightness. As will be explained the post 23 is utilized for the operation of the head by applying power at the lower end of the post. In one sense the head 20 and the post 23 constitute a single rigid member of the shape of the letter L, or a bell crank lever, permitting the operating force to be applied horizontally at the lower end of the post, producing vertical movements of the head, preferable to applying the force vertically directly upon the head or an extension thereof, rendering the operation more effective while minimizing vibration. The rigid connection between the head 20 and the post 23, already described, is such as to permit adjustment both circularly and vertically between the two parts.

The combined presser and post may be mounted as follows for operative swinging movements to cause the descent of the head upon the die. The lateral sides of the rounded rear portion of the presser head are shown formed with short stud shafts or trunnion shafts 27, engaging in corresponding recesses in a pair of opposite trunnion bearings or lugs 28 upstanding from a ring or flange 29 formed at the upper end of a rotary or swivelled sleeve 30. This sleeve 30 is snugly fitted within the recess in a frame part 31, so that it may turn freely about a vertical axis, without swinging motion or loose play. The lower end of the sleeve 30 is threaded or grooved and surrounded by a corresponding locking ring 32, snugly confining the sleeve against vertical movement. A thrust bearing 33 may be interposed between the upper flange 29 of the sleeve and the frame portion or cylinder 31, so as to facilitate the lateral swinging of the head 20. These described arrangements are simple and strong yet effectively afford the two motions already referred to.

As a means of actuating the presser head there is shown an electromagnet 34 bolted to the lower end of the post 23. In using the term magnet it is intended to include other devices such as a solenoid; and for some purposes the particular fittings and arrangement of the presser head and connections may be useful with other types of actuating means, such as pneumatic or hydraulic devices applied to the lower end of the post 23. The magnet 34 may consist of a hollow shell 35 formed with a rear pole 36 and a front pole 37, an iron core 38 extending through the interior from pole to pole and a suitable coil or windings 39 surrounding the core and filling the shell, with exterior terminals 40, the whole being designed to give the maximum magnetic effect, so that the pole 38, operating in conjunction with a fixed armature, may deliver a quick powerful rearward movement to the lower end of the post 23. An advantageous armature 41 is shown consisting of a heavy iron casting or extension of the frame, shaped in an arc, as shown in Fig. 3, concentric with vertical axis of rotation of the post 23 and sleeve 30. This permits the presser head to be swung laterally, causing also swinging movements of the magnet, the latter always effectively facing the armature, and delivering a thrust, which is not always directly rearwardly, but is in the direction that the post 23 must swing to cause the descent of the presser head. As will be described it is preferred to apply a powerful current to energize the magnet, causing the operative movement of the presser head, immediately deenergizing the magnet, and delivering a momentary reverse current to neutralize the residual magnetism and thus facilitate the forward retracting movement of the magnet to restore the presser head to its elevated position. The forward or retracting movement of the post 23 and the actuating magnet may be effected in various ways, preferably by resilient means, such as a spring 43 having its rear end attached to a projection 44 beneath the center of the magnet and its forward end secured to a suitable fixed frame part. While the arrangement of armature and magnet might in some cases be reversed, the magnet being held fixed and the armature attached to the post, the described arrangement is better and more convenient especially in that it enables a concentric fixed armature adapted to cooperate with the swinging magnet in any position of the latter.

The control of the described machine may be through electric circuits and switches operable at will, either by hand or by foot. Figs. 1 and 2 show a switch box 50 at the upper part of the machine, mounted on the presser head 20, and Fig. 1 shows a second such switch box 51 near the bottom of the machine, which may operate analogously. The lower switch box may be operated by a pedal 52, through a bell crank lever 53, fulcrumed at 54, on a fixed machine bracket 55, the forked upper end 56 of the lever engaging the pin of a crank 57 to rotate the operating axle or shaft of the switch box. The upper switch box 50 may be controlled from the handle 21 by which the presser head is swung right and left, as follows. The handle 21 is mounted on the forward arm 59 of a lever fulcrumed on the head at 60, the rear arm 61 having a slotted rear extremity 62 engaging a pin 63 on an actuating slide rod 64, which is shown in its lowered position in Fig. 1, but is adapted to be pulled upwardly by the depression of the handle 21 against the force of a spring 22 which tends to hold the handle elevated and the slide rod depressed. The slide rod or bar 64 is formed with a toothed rack 65 engaging a toothed wheel 66, which is thus rotated by the depression of the handle 21, causing the operation of the switch. The two switch boxes may be substantially alike, each operated by the rotation of its shaft, and both giving the same control, so that it is sufficient to describe the structure, operations and connections for the upper switch box, which will be done in connection with Figs. 5 to 10.

The magnet may be energized from any suitable source of current, for example the usual light and power circuits of the plant. Line wires A and B are indicated in Fig. 1, the wire B extending at $b$ to one of three fixed contacts in the switch box, as will be described, while the wire A is branched, the extension $a$ extending to a second of the contacts, while the branch $a'$ passes to an adjustable resistance or rheostat $a^2$ and then by wire $a^3$ to the third of the contacts, this contact taking part in the momentary reversal of current to demagnetize the magnet, the rheostat serving adjustably to reduce the current to give the best results while avoiding actuation of the presser head by the reverse magnetism. The corresponding connections for the lower switch box 51 may be exactly analogous and are not further described. In each case the outgoing conductors C and D from the switch box pass to the terminals 40 of the magnet coil 39, so that under control of the switch box the magnet will be energized, deenergized and demagnetized as stated. The cycle of operations may be that when the handle 21 is thrown down, after the presser head is positioned over the die, this operates the switch box 50 in a manner first to throw full current into the magnet coils, the magnetism thereupon drawing the magnet rearwardly to the armature and throwing down the presser head to force the die through the goods. With the release of the handle it rises to a normal position, and during this ascent the current is first cut off from the coil, and then a current of much lower strength is introduced into the coil in the opposite direction, to ensure neutralizing the residual magnetism and permit release, the final lifting movement of the handle 21 throwing off all current, while the spring 43 pulls forwardly the magnet, raising the presser head from the die.

As seen in Fig. 1 and Figs. 5-8 the switch box 50 is a substantially square structure enclosed by walls 69, the top wall having a slideway or bearing 70 for the rack bar 64 and the bottom wall having a bearing 71 for the bar, the box being spaced above the presser head to give clearance for the downward movements of the bar. As already stated the rack 65 and bar 64 serve to rotate a gear 66, which may be mounted on an axle 73, which is preferably the shaft of the switch box, and keyed to the gear, as indicated in Fig. 5. The gear 66 and certain other parts surrounding the shaft are arranged to undergo partial rotation at certain times, and to permit rotation of the shaft it is journalled in wall bearings 74 and 75 at its right and left ends respectively, such as to permit not merely rotation but a certain endwise sliding as will be described.

The circuit changing operations within the switch box take place due to the rotation and sliding movements of the parts already referred to in conjunction with certain fixed contacts. At the inside of the right hand wall is shown a stationary disk 78 which may be formed of fiber, and through which extend three contacts 79, 80 and 81, relatively arranged as shown in Figs. 5 and 6 and in the diagrams Figs. 9 and 10. The contact 79 has an exterior binding post $79^a$ connected to the branch wire $a$ and line wire A already referred to. The fixed contact 80 has an exterior binding post $80^a$ connected to the wire $b$ and line wire B. The contact 81 has an exterior binding post $81^a$ connected to the branch wire $a^3$ and thence to the line wire A through the rheostat $a^2$, a reversed current of decreased amperage being intended to be introduced through this contact. As will be explained a pair of movable contacts is operated to contact with 79 and 80 at one stage to deliver full current to connecting wires C, D for energizing the magnet, and at another stage with contacts 80 and 81 to deliver a reduced reverse current thereto. The movable contacts rotate about the central shaft to change their adjustment, and slide axially to move them into and out of contact, as will be described.

Before describing the interior operations the switch box connections for the conductors C and D will be described. These involve interior contacts 82 and 83 which are in the nature of brushes, being spring pressed inwardly to maintain sliding contact against the rotary rings to be described. Exterior of the spring pressed brush 82 is a binding post $82^a$ connected with the conductor C, and exterior to the brush contact 83 is a binding post $83^a$ from which extends the conductor D.

Fig. 5 shows the rotary position of the interior parts in their normal condition, when the circuits are open. By comparison Fig. 6 shows the changed rotary position when the contacts are closed for energizing the magnet and operating the presser head. These views are in left elevation. Fig. 7 in plan view and Fig. 8 in rear elevation show the interior parts in full lines with the circuits open, dotted line positions being indicated to illustrate the extent of axial shifting movement in effecting closing of the circuits. Fig. 9 in perspective shows the circuits closed for operation of the magnet and Fig. 10 the later stage when the movable contacts are shifted so as to give a closed circuit with reduced current in reverse direction.

The rotary assemblage surrounding the switch shaft 73 may consist of a porcelain core 85 and surrounding it certain metallic (brass) conducting rings and insulating (fiber) rings, and certain control devices. Normally, when out of operation, the rotary position of the parts is as indicated in Figs. 5, 7 and 8. When the handle 21 is fully depressed the parts rotate to the position indicated in Fig. 6, and undergo endwise movement to bring the contacts into contact; whereas on releasing the handle the parts, returning to normal position, first rotate from the Fig. 6 position substantially to the Fig. 5 position, and are then restored axially to the normal position seen in Figs. 7 and 8; these operations governed by a cam, a stop and a latch to be described. The several rings are preferably assembled outside the switch axle by means of the interior porcelain core 85, which is preferably connected to the shaft or at least to the gear 66 so that all these parts rotate and slide in unison. Surrounding the porcelain core are shown the following elements. Next to the gear 66 is what may be termed the control ring 86. Next a fiber insulating ring 87. Next the first brush ring or annular contact 88, then another fiber ring 89 and finally the second brush ring 90. It will be seen that the brush ring 88 cooperates with the brush 83 and the brush ring 90 with the brush 82, the two rings having sufficient axial dimension to maintain contact throughout the sliding as well as rotating movements.

Before describing the two moving contacts and their cooperation with the three fixed contacts 79, 80 and 81 there will be described the actuation and control of the rotating and sliding assemblage. The parts are normally held retracted by spring means, pressing the parts to the right in Fig. 8. This may consist of a plunger 92 mounted to slide axially in a fiber sleeve or guide 93, with a coil spring 94 to the rear of the plunger, and an abutment 95 beyond the spring, in the form of a screw plug by which the tension of the spring can be adjusted. The plunger is adapted to slide around a portion of the surface of the fixed fiber disk 78, and the spring pressure causes the assemblage 85—90 to be pressed away from the fiber disk, as shown in Figs. 7 and 8. This spring retracting pressure would prevent the movable contacts ever meeting the fixed contacts in the fiber disk except for the cam and latch control now to be described.

The control ring 86 is formed with an external stud or follower 97. This is shown in Figs. 5, 7 and 8 as contacting normally against a fixed stop 98. This forms the stop for the spring 22 resisting the depression of the handle 21. When the handle moves up the stud 97 bears against the fixed stop. When the handle is moved down this slides the rack bar 64 and rotates the gear 66, shaft 73 and ring assemblage from the normal position of Fig. 5 to the position of Fig. 6 in which the circuit is closed. As shown this is about 90° of rotation. During this rotation the stud or follower 97 on the control ring 86 moves around from the normal position described to the dotted line position shown in Fig. 8, shown also in full lines in Fig. 6. The latter part of this rotary motion of the stud carries it against a fixed cam plate 99 having an inclined cam surface 100 operating to throw the stud and the entire assemblage to the left in Fig. 8, as indicated by the dotted lines, this movement terminating when the stud meets the stop shoulder 101 at the terminus of the cam, this stop being the limit to the downward movement of the handle 21. In this way the rotary motion imparted by the descent of the handle causes the ring assemblage to shift axially and close the contacts for energizing the magnet. If now there were no further control the release of the handle would cause the parts to return over the same course of movement, and there would be no reverse current to demagnetize the magnet. There is therefore provided a spring latch 103, which normally is inoperative as seen in Figs. 5 and 8, but which is adapted to spring upwardly, with its extremity beyond the control ring 86, as seen in Fig. 6, so as to hold the assemblage in its operative position. By this means the return rotation of the assemblage compels the contacts to pass through the stage wherein reverse current is momentarily introduced. At the end of the return rotary movement it is necessary to release the ring assemblage from the latch 103 and for this purpose the control ring 86 is provided with a peripheral button or projecting cam 104. By comparing Figs. 6 and 5 it will be seen that on the return movement the button operates to throw down the latch 103, this action shown also in dotted lines in Fig. 8, thereby releasing the ring assemblage from the latch and permitting all the parts to return to original position.

Cooperating with the three fixed contacts 79, 80 and 81 are the two movable contacts 106 and 112, suitably mounted in the ring assemblage to partake of the rotary and sliding movements thereof. Fig. 5 indicates the normal inoperative position of the movable contacts 106, 112, the circuit being open. Fig. 6 indicates their operative position when the assemblage has been rotated 90° and slid axially to force the movable contacts against the fixed contacts 79 and 80. Depressing the handle 21 causes this adjustment. Releasing the handle permits the parts to rotate reversely from the Fig. 6 to the Fig. 7 position, but the latch 103 prevents sliding, so that the movable contacts will momentarily contact the fixed contacts 80 and 81 just before reaching their final or normal position of Fig. 5. The diagram Fig. 9 corresponds with Fig. 6 in position and Fig. 10 shows the movable contacts in contact with the fixed contacts 80 and 81, which is the momentary condition giving reverse current for demagnetization purposes.

The first movable contact 106 is shown fitted in a fiber sleeve 107 and pressed outwardly by a spring 108 confined by a plug 109. The contact is in connection with the ring 88 by a connecting device 110. The second movable contact 112 similarly slides in a fiber sleeve 113 and is pressed by a spring 114 confined by a plug 115, the contact having a connection 116 to the ring 90.

The complete circuits may be traced substantially as follows: When the contacts are adjusted for energizing the magnet the current from line wire A passes to fixed contact 79 and thence to movable contact 112, to ring 90, to brush 82, and by conductor C to the coils 39 of the magnet, thence back by conductor D to brush 83, to ring 88, to movable contact 106 and thence by fixed contact 80 to line wire B. With the momentary reverse current, as indicated in Fig. 10, the circuits will be substantially the same with the exception that movable contact 112 now contacts fixed contact 80 instead of 79, while movable contact 106 contacts with fixed contact 81 instead of 80, so that the current from the line wires is introduced reversely into the magnet coils, the rheostat $a^2$ however introducing a resistance so that the momentary reverse current is greatly reduced, and while sufficient for demagnetizing purposes, is insufficient to cause actuation of the presser head.

The operation of the described mechanism has been largely indicated. After the die has been placed over the leather upon the cutting block and the presser swung out over the die it is only necessary to depress the handle 21, causing the switch box contacts to take the position of Figs. 6 and 9, thus energizing the magnet and forcing the presser head down upon the die. As long as the handle 21 is held down the pressure will continue. The same is true of the pedal 52. When either of these controllers is let fully up the current is thrown off, and during this restoration of the parts the reverse flow indicated in Fig. 9 takes effect to demagnetize the magnet, and the machine is ready for further operation.

In the case of the handle 21, due to its vertical operating movement, a succession of blows or pressures upon the die can be effected by first depressing the handle to cause normal operation and then letting it up slightly, just enough to disconnect the movable contacts from the fixed contacts. If now the presser lifting spring 43 is strong enough to overcome the residual magnetism the presser will start to rise, which causes a relative lowering of the handle, and swings the lever 59, 61 so as again to close the contacts, whereby the magnet will be reenergized, the presser head again pulled down, the circuit again opened, the presser head again lifted, and so on; resulting in a vibratory action upon the top of the die. Such action is easily avoided by thrusting the handle 21 fully downward to operate the machine and letting it fully upward after operation, or by using the foot pedal. With thin leather or other light material a single pressure or blow will usually be sufficient.

Many variations of structure and operation may be introduced. Instead of having the downward post 23 there may be a rearward extension of the presser head, forming a walking beam, the rear end lifted by a magnet or solenoid to press the forward end upon the die. In some cases both the rearward and downward extensions may be omitted by employing the presser head itself as the armature and locating the magnet within and surrounding the cutting block, so as to pull the head directly upon the die. Instead of a handle 21 movable relatively on the head, the latter may be resiliently suspended, and the circuits arranged so that when the operator pulls down upon the head this will close the circuit and the downward thrust will be continued by the magnetic, pneumatic or other force, with a suitable releasing device. Where extreme force is required the magnet may be caused to operate through a toggle to depress the head toward the cutting block. For example, the electromagnetic operating means may consist of a horizontal solenoid, mounted above and to the rear of the bed, operating forwardly to straighten a vertical toggle, the upper end of which is mounted on a laterally swinging arm, the lower end on the descending presser head, and the solenoid may be rendered more effective by a commutator which progressively cuts off the rear turns of wire as the magnetic center of the core passes the same. This embodiment is made the subject of a copending application Serial No. 150,260, filed November 23, 1926. The head has been described as adjustable vertically and swingingly at the top of the post 23, and screw devices may be employed for effecting such adjustments.

One of the main features of this invention may be described as a clicking machine presser head which can be swung horizontally over the cutting block, and operated to descend toward the block by a rocking movement about a horizontal trunnion, rock shaft, or other bearing, and the operating force applicable to effect the downward rocking of the head in any selected position to which it may be swung; thus eliminating the objections of the prevailing form of clicking machine in which the presser head and its connected parts are moved downwardly and upwardly with a sliding motion. A second important feature hereof is the practical introduction of electrical or magnetic force to cause the operative or descending movements of the presser head of a clicking machine. While these two features are herein shown combined in a single machine, and cooperate to great advantage, each of such features is of utility independently of the other. The various subordinate features hereinbefore described may advantageously be used with either or both of the underlying features just referred to.

It will thus be seen that I have described a machine or press for cutting leather or other material embodying the principles and attaining the advantages of the present invention. Many matters of combination, arrangement, structure and design may be variously modified without departing from the principles and therefore it is not intended to limit the invention to such matters except so far as is specified in the appended claims.

What is claimed is:

1. In a clicking machine for cutting out leather or like material by means of a loose die placed selectively upon the material, a cutting bed supporting the material, a presser member adapted to overhang substantially all portions of the bed, and mounted to rock about a transverse axis toward the bed, and electromagnetic means for rocking the presser member with a quick cutting stroke toward the bed whereby to drive the die through the material; the presser member being normally held retracted from the bed at a slight angle to the bed, but arranged to rock toward the bed with its under surface in parallelism with the bed at the end of its operative movement.

2. In a machine for cutting out leather or like material by means of a die, a cutting bed having a flat surface supporting the leather, a presser member adapted to drive the die through the leather at any selected position on the bed and mounted to move toward and from the bed, and electromagnetic means for causing a quick cutting stroke of the presses toward the bed, control means for energizing the electromagnetic means, and means for retracting the presser from the bed.

3. In a clicking machine for cutting out leather or like material by means of a die placed selectively upon the material, a cutting bed supporting the material, a presser member having an under surface overhanging the bed, and swingable laterally to selected positions and adapted to rock about a transverse axis toward the bed, and having a rigid upright extension, and means operating upon said extension in a substantially horizontal direction for rocking the presser member with a quick cutting stroke toward the bed in any swung position of the presser member, whereby to drive the die through the material.

4. In a clicking machine for cutting out leather or like material by means of a loose die placed selectively upon the material, a cutting bed supporting the material, a presser member having an under surface overhanging the bed, and swingable laterally to selected positions and adapted to rock about a transverse axis toward the bed, the presser extending rearwardly from above the bed, with a transverse rock shaft at the rear, and a downward extension, and means pulling rearwardly on said extension for rocking the presser member with a quick cutting stroke toward the bed in any swung position of the presser member, whereby to drive the die through the material.

5. In a machine for cutting out leather or like material, a frame, a cutting bed, an overhanging presser swingable laterally to selected positions and adapted to rock toward the bed, and means for rocking the presser in any swung position thereof; the presser extending forwardly from the rocking axis and having a rigid downward extension adapted to rotate when the presser is swung laterally over the bed, and the means for rocking the presser operating in a rearward direction upon the lower part of such extension to rock the combined extension and presser in any position thereof.

6. In a machine for cutting out leather or like material, a frame, a cutting bed, an overhanging presser swingable laterally to selected positions and adapted to rock toward the bed, and means for rocking the presser in any swung position thereof; the presser having a rigid post depending therefrom, and the rocking means operating rearwardly upon the post in a plane at right angles to the rocking axis.

7. In a machine for cutting out leather or like material, a frame, a cutting bed, an overhanging presser swingable laterally to selected positions and adapted to rock toward the bed, an intermediate part between the frame and presser, the presser mounted on said part to rock about a transverse axis, and said part mounted on the frame to rotate about an upright axis, and the presser having a revoluble upright extension post which turns as the presser swings, and means for rocking the presser in any swung position thereof, operating upon said extension in a line of operation adjustable with the position of the post and extension.

8. In a machine for cutting out leather or like material, a frame, a cutting bed, an overhanging presser movable laterally to selected positions over the bed and adapted to rock toward the bed, and means for rocking the presser toward the bed in any selected position of the presser, consisting of an electromagnet and control means for energizing it.

9. In a machine for cutting out leather or like material, a frame, a bed, a presser swingable laterally over the bed and movable toward and from the bed, and electromagnetic operating means for moving the presser towards the bed.

10. Machine as in claim 9 and wherein a spring resists the actuation of the presser and restores it to retracted position.

11. Machine as in claim 9 and wherein an electromagnet is carried by the head and cooperates with an armature carried by the frame.

12. Machine as in claim 9 and wherein an electromagnet is carried by and shifts with the swing of the head, and an elongated curved armature mounted on the frame to cooperate with the electromagnet in all positions thereof.

13. Machine as in claim 9 and wherein the presser at its rear end is mounted to rock about a horizontal axis and has a rigid downwardly extending post which turns with the swing of the head, and said operating means comprises an electromagnet mounted on said post, means for controlling current flow thereto, and an armature cooperable with the electromagnet in all positions thereof.

14. Machine as in claim 9 and wherein the presser at its rear end is mounted to rock about a horizontal axis and has a rigid upright post which turns with the swing of the head, and said operating means comprises an electromagnet mounted on said post, means for controlling current flow thereto, and an arc shaped armature mounted on the frame to face the pole of said magnet in all positions thereof.

15. In a machine for cutting out leather or like material, a frame, a bed, a presser swingable laterally over the bed and movable toward and from the bed, electromagnetic operating means for moving the presser towards the bed, and control means adapted to close a circuit through said electromagnet and to open such circuit.

16. In a machine for cutting out leather or like material, a frame, a bed, a presser selectively shiftable over the bed and movable toward and from the bed, electromagnetic operating means for moving the presser towards the bed, and control means adapted to close a circuit through said electromagnet and to open such circuit, and thereafter to deliver a reduced reverse current to demagnetize the electromagnet.

17. In a machine for cutting out leather or like material, a frame, a bed, a presser shiftable laterally over the bed and movable toward and from the bed, electromagnetic operating means for moving the presser towards the bed, and control means adapted to close a circuit through said electromagnet and to open such circuit, said control means comprising a rotary element, means for rotating said element at will, contacts brought into opposition by such rotation, and a cam causing endwise movement to cause the contacts to meet.

18. In a machine for cutting out leather or like material, a frame, a bed, a presser shiftable laterally over the bed, and movable toward and from the bed, and operating means for moving the presser towards the bed, comprising an electromagnet, two pairs of opposing contacts adapted to be mutually contacted to close a circuit through said electromagnet, and a third contact with one of said pairs adapted to effect a reversal of current upon a shift of contacts, to demagnetize the magnet.

19. In a machine for cutting out leather or like material, a frame, a bed, a presser shiftable laterally over the bed, and movable toward and from the bed, and operating means for moving the presser towards the bed, comprising an electromagnet, two pairs of opposing contacts adapted to be mutually contacted to close a circuit through said electromagnet, a third contact cooperating with one of said pairs adapted to effect a reversal of current upon a shift of contacts, to demagnetize the magnet, and a resistance in circuit with the third contact to reduce the demagnetizing effect.

20. In a machine for cutting out leather or like material, a frame, a cutting bed, an overhanging presser swingable laterally to selected positions and adapted to rock toward the bed, and means for rocking the presser in any swung position thereof; the presser having a rigid upright extension or post, with the extremity of which the rocking means cooperates, said presser and post being relatively adjustable, and means to rigidly secure them when adjusted.

21. In a machine for cutting out leather or like material, a frame, a cutting bed, an overhanging presser swingable laterally to selected positions and adapted to rock toward the bed, and means for rocking the presser in any swung position thereof; the presser having a rigid upright extension or post, with the extremity of which the rocking means cooperates, said presser and post being relatively adjustable, both vertically and angularly, and means to rigidly secure them when adjusted.

In testimony whereof, I have affixed my signature hereto.

JOHN ROGER OLIVER.